United States Patent
Dejoras et al.

(10) Patent No.: US 10,241,646 B2
(45) Date of Patent: Mar. 26, 2019

(54) FILE DIRECTORY NAVIGATION DESIGN FOR A MULTI-FUNCTION DEVICE TOUCH SCREEN USER INTERFACE

(71) Applicant: Xerox Corporation, Norwalk, CT (US)

(72) Inventors: Evangeline C Dejoras, Cerritos, CA (US); Gary D. Reece, Whittier, CA (US); Nisha Pan, Los Angeles, CA (US)

(73) Assignee: Xerox Corporation, Norwalk, CT (US)

( * ) Notice: Subject to any disclaimer, the term of this patent is extended or adjusted under 35 U.S.C. 154(b) by 347 days.

(21) Appl. No.: 14/831,446

(22) Filed: Aug. 20, 2015

(65) Prior Publication Data

US 2017/0054861 A1    Feb. 23, 2017

(51) Int. Cl.
  *G06F 3/048*    (2013.01)
  *G06F 3/0482*    (2013.01)
  *H04N 1/00*    (2006.01)

(52) U.S. Cl.
  CPC ....... *G06F 3/0482* (2013.01); *H04N 1/00392* (2013.01); *H04N 1/00429* (2013.01); *H04N 2201/0094* (2013.01)

(58) Field of Classification Search
  CPC ........... H04N 1/00429; H04N 1/00392; H04N 2201/0094; G06F 3/0482
  See application file for complete search history.

(56) References Cited

U.S. PATENT DOCUMENTS

| | | | |
|---|---|---|---|
| 2002/0024685 A1* | 2/2002 | Sasaki ................ | H04N 1/00212 358/402 |
| 2005/0174603 A1* | 8/2005 | Iinuma ............... | H04N 1/00204 358/1.16 |
| 2007/0033540 A1* | 2/2007 | Bridges ................. | G06F 3/0482 715/769 |
| 2010/0115468 A1* | 5/2010 | Kodimer ........... | G06F 17/30011 715/838 |
| 2011/0069353 A1* | 3/2011 | Sawayanagi ....... | H04N 1/32122 358/1.16 |

OTHER PUBLICATIONS

"uniFlow—Scan to Dropbox," Nov. 18, 2014, https://www.youtube.com/watch?v=mCzhF8FKx20, pp. 1-7.*
"Brother—Web Connect Guide," 2012, pp. 1-36.*

* cited by examiner

*Primary Examiner* — Kieu D Vu
*Assistant Examiner* — Asteway T Gattew

(57) ABSTRACT

A method, non-transitory computer readable medium and apparatus for navigating a file directory on a touch screen user interface (UI) of a multi-function device (MFD) are disclosed. For example, the method includes receiving an input via the touch screen UI of the MFD, wherein the touch screen UI displays a modified UI of a plurality of different cloud applications, wherein each one of the plurality of different cloud applications is associated a different function, determining a cloud application of the plurality of different cloud applications associated with a particular function is currently selected in the MFD, translating the input based upon the particular function of the cloud application that is selected and executing the input in accordance with the particular function of the cloud application.

2 Claims, 6 Drawing Sheets

FILE DIRECTORY NAVIGATION DESIGN FOR A MULTI-FUNCTION DEVICE TOUCH SCREEN USER INTERFACE

The present disclosure relates generally to a touch screen user interface and, more particularly, to a method and apparatus for navigating a file directory on a touch screen user interface of a multi-function device.

BACKGROUND

Touch screen user interfaces on a multi-function device (MFD) are typically much smaller than a desktop monitor or even a tablet computer. As a result, the typical file directory designs and navigation methods on a desktop computer or a tablet computer may not translate well for the much smaller touch screen user interface of an MFD.

For example, on a desktop application, the standard way to select an object is to single click the object. If you are in a file tree, a single click of a folder selects the folder and discloses the contents of the folder on the right pane or below. As folders are further selected, additional panes or lines are displayed to the right or further below. When in a pane, a single click may select an object and a double click may open the object.

Typically, the images used for the object in front of a folder name include an arrow pointing to the right or a plus sign with a circle. These types of images are not naturally intuitive, although users have become familiar with what these images convey.

In a typical browser based user interface example, a single click serves a dual purpose as a selection and a navigation mechanism. A single click on an object reveals its contents by placing the user within the folder. The folder whose contents are being viewed becomes the de facto destination when uploading a file. However, these designs and methods may not work well for the smaller touch screen user interfaces of an MFD.

SUMMARY

According to aspects illustrated herein, there are provided a method, non-transitory computer readable medium and apparatus for navigating a file directory on a touch screen user interface (UI) of a multi-function device (MFD). One disclosed feature of the embodiments is a method that receives an input via the touch screen UI of the MFD, wherein the touch screen UI displays a modified UI of a plurality of different cloud applications, wherein each one of the plurality of different cloud applications is associated with a different function, determines a cloud application of the plurality of different cloud applications associated with a particular function is currently selected in the MFD, translates the input based upon the particular function of the cloud application that is selected and executes the input in accordance with the particular function of the cloud application.

Another disclosed feature of the embodiments is a non-transitory computer-readable medium having stored thereon a plurality of instructions, the plurality of instructions including instructions which, when executed by a processor, cause the processor to perform operations that receive an input via the touch screen UI of the MFD, wherein the touch screen UI displays a modified UI of a plurality of different cloud applications, wherein each one of the plurality of different cloud applications is associated with a different function, determine a cloud application of the plurality of different cloud applications associated with a particular function is currently selected in the MFD, translate the input based upon the particular function of the cloud application that is selected and execute the input in accordance with the particular function of the cloud application.

Another disclosed feature of the embodiments is an apparatus comprising a processor and a computer-readable medium storing a plurality of instructions which, when executed by the processor, cause the processor to perform operations that receive an input via the touch screen UI of the MFD, wherein the touch screen UI displays a modified UI of a plurality of different cloud applications, wherein each one of the plurality of different cloud applications is associated with a different function, determine a cloud application of the plurality of different cloud applications associated with a particular function is currently selected in the MFD, translate the input based upon the particular function of the cloud application that is selected and execute the input in accordance with the particular function of the cloud application.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly discloses a method and apparatus for navigating a file directory on a touch screen user interface (UI) of a multi-function device (MFD). As discussed above, touch screen user interfaces on an MFD are typically much smaller than a desktop monitor or even a tablet computer. As a result, the typical file directory designs and navigation methods on a desktop computer or a tablet computer may not translate well for the much smaller touch screen UI of an MFD.

For example, on a desktop application, the standard way to select an object is to single click the object. If you are in a file tree, a single click of a folder selects the folder and discloses the contents of the folder on the right pane or below. As folders are further selected, additional panes or lines are displayed to the right or further below. When in a pane, a single click may select an object and a double click may open the object.

Typically, the images used for the object in front of a folder name include an arrow pointing to the right or a plus sign with a circle. These types of images are not naturally intuitive, although users have become familiar with what these images convey.

In a typical browser based user interface example, a single click serves a dual purpose as a selection and a navigation mechanism. A single click on an object reveals its contents by placing the user within the folder. The folder whose contents are being viewed becomes the de facto destination when uploading a file.

However, these designs and methods may not work well for the smaller touch screen user interfaces of an MFD. For example, due to the much smaller screen sizes of touch screen UIs on MFDs (e.g., 5 inches×7 inches and smaller), there may not be enough real estate on the display to open all of the additional panes horizontally or files and folders below when a file is opened.

In addition, on the touch screen UI of the MFD, touching an object may be the only way to select the object. In other words, the touch screen UI does not allow a single click or a double click to distinguish from a selection of an object or opening an object.

Furthermore, due to the lack of space on the smaller displays of the MFD, a limited amount of space is available for conveying information. For example, there may not be as much space for text to explain every icon. Embodiments of the present disclosure also provide more intuitive graphical icons to convey information (e.g., arrows pointing to a bottom right hand corner of a box to indicate the folder contains additional files or folders).

Figure 1:
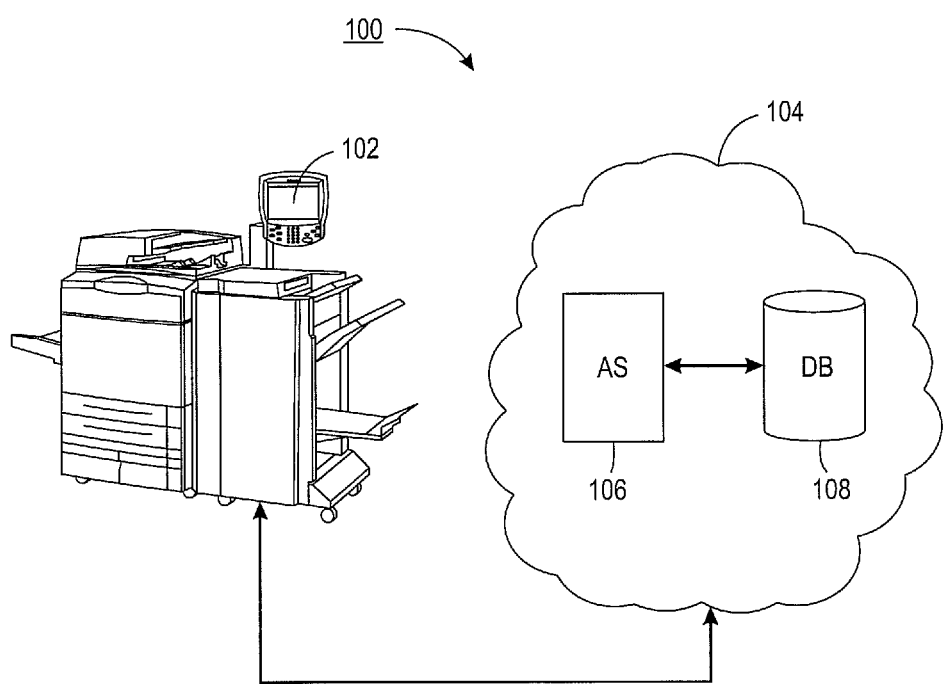
FIG. 1 illustrates an example block diagram of an MFD of the present disclosure.

One embodiment of the present disclosure provides a unique file directory design and navigation method for addressing the constraints of the smaller display of touch screen UIs on MFDs. FIG. 1 illustrates an example MFD 100 of the present disclosure. In one embodiment, the MFD 100 may be a device having a processor and memory. The MFD 100 may be capable of performing a plurality of different functions. In one embodiment, the plurality of different functions may include printing, scanning, copying, faxing, and the like.

In one embodiment, the MFD 100 may have a display 102. The display 102 may be a touch screen UI. In one embodiment, the display 102 is small. For example, the dimensions of the display 102 may be 12 inches by 12 inches or smaller. In one embodiment, the display 102 may have widescreen dimensions. For example, the dimensions of the display 102 may be 5 inches by 7 inches or smaller.

In one embodiment, the MFD 100 may have wireless or wired communication capability with an Internet Protocol (IP) network 104 via the Internet. In one embodiment, the IP network 104 may have an application server (AS) 106 and a database (DB) 108 remotely located from the MFD 100. In one embodiment, the AS 106 and the DB 108 may be associated with a cloud based service provider.

It should be noted that the IP network 104 has been simplified for ease of explanation. For example, the IP network 104 may include additional network elements (not shown) such as a router, a gateway, a switch, a firewall, one or more access networks, and the like.

In one embodiment, the cloud based service provider may be a cloud storage service provider. In one embodiment, the MFD 100 may allow a user to directly connect to the cloud storage service provider via the touch screen UI on the display 102. For example, the user may connect and login to the cloud storage service provider and use the MFD 100 to perform one or more different functions (e.g., scanning to a file in the DB 108 in the cloud or printing a document stored in the DB 108 from the cloud).

The cloud storage service providers typically use a traditional file directory system and navigation method. For example, the cloud storage service provider may use a file directory tree that either drops down additional files and folders when a file clicked on or open a new window pane to the right. In desktop embodiments, different responses may be associated with a double click and a single click.

In addition, a desktop computer or tablet computing device may also provide additional drop down menus that include commands. For example, when a user accesses a cloud storage service on a desktop computer, a user may select a file and from a drop down menu select a print command. However, using a drop down menu is a very inefficient way to navigate in touch user interfaces, such as a tablet computing device.

However, as noted above, the MFD 100 may have a display 102 that is relatively small (e.g., 5 inches by 7 inches). As a result, the display may be unable to display the same file directory tree as the cloud storage service provider. In addition, the touch screen UI of the display 102 may only allow a single type of input (e.g., a touch) and not have the ability to distinguish between a single click or a double click used by the navigation methods of the cloud storage service provider.

As a result, one embodiment of the present disclosure provides a novel file directory and navigation design for the touch screen UI shown on the display 102 of the MFD 100. The file directory design only displays files or folders that are contained within a selected folder without using additional window panes. In addition, a single input may be used to perform different actions based on what cloud application is selected. Said another way, the same input may be used to perform two different actions depending on which cloud application is selected. In addition, the same input may automatically perform an action or command without requiring the user to perform an additional selection to select a command on the selected folder or file (e.g., selecting a "print" command from a drop down menu in a "file" drop down menu).

Figure 2:
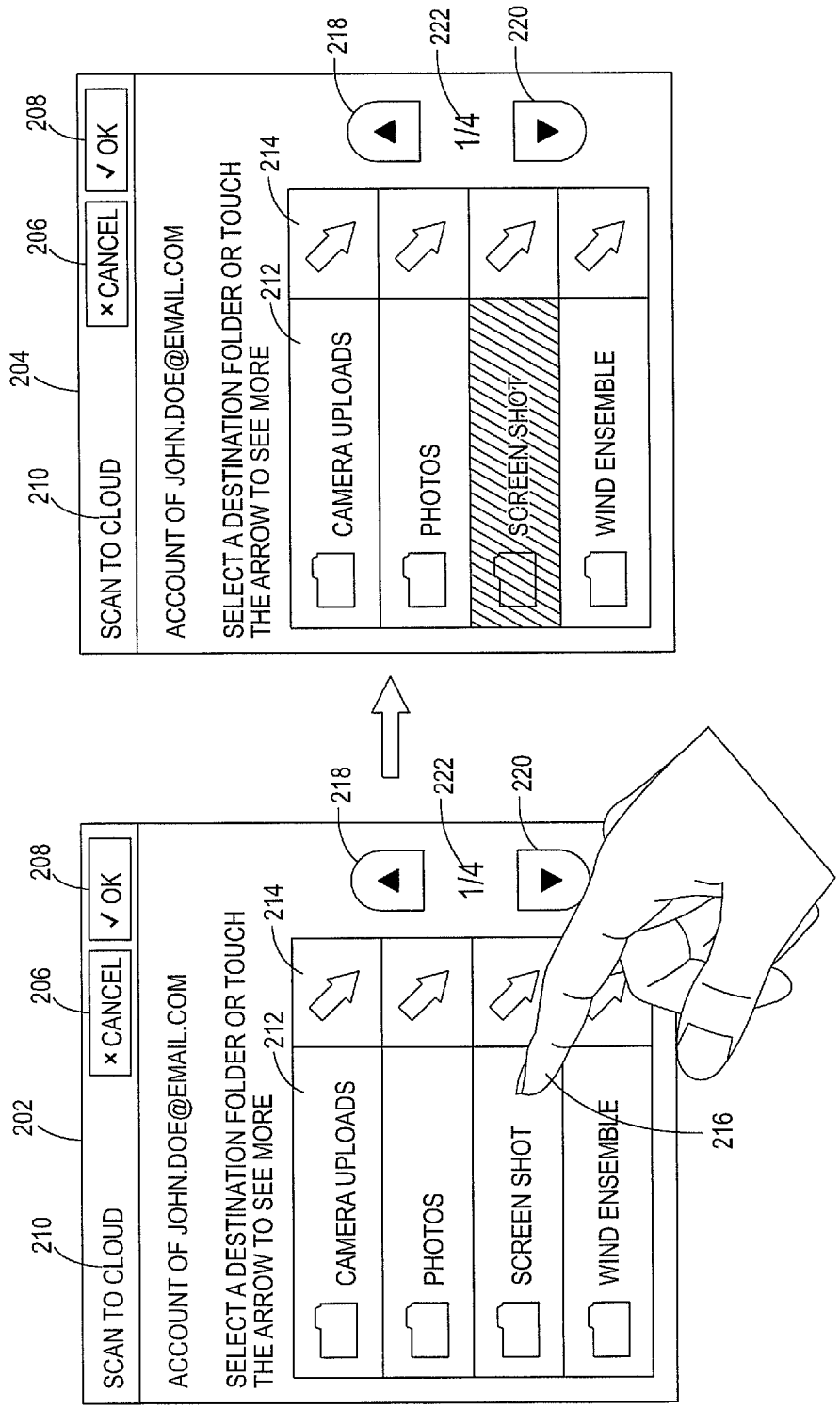
FIG. 2 illustrates an example screenshot of an input in a cloud scanning application.
Figure 3:
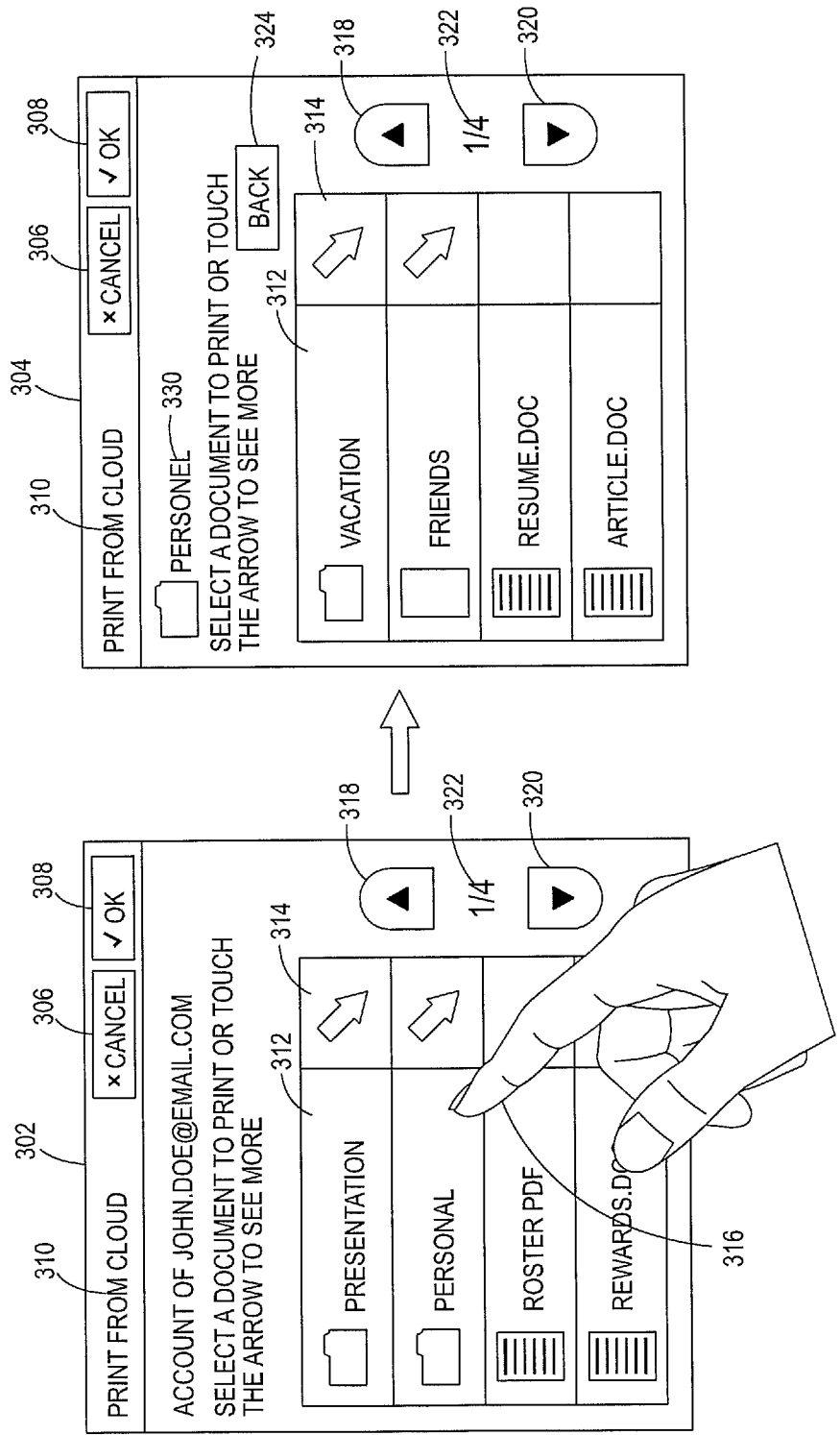
FIG. 3 illustrates an example screenshot of the input in a cloud printing application.
Figure 4:
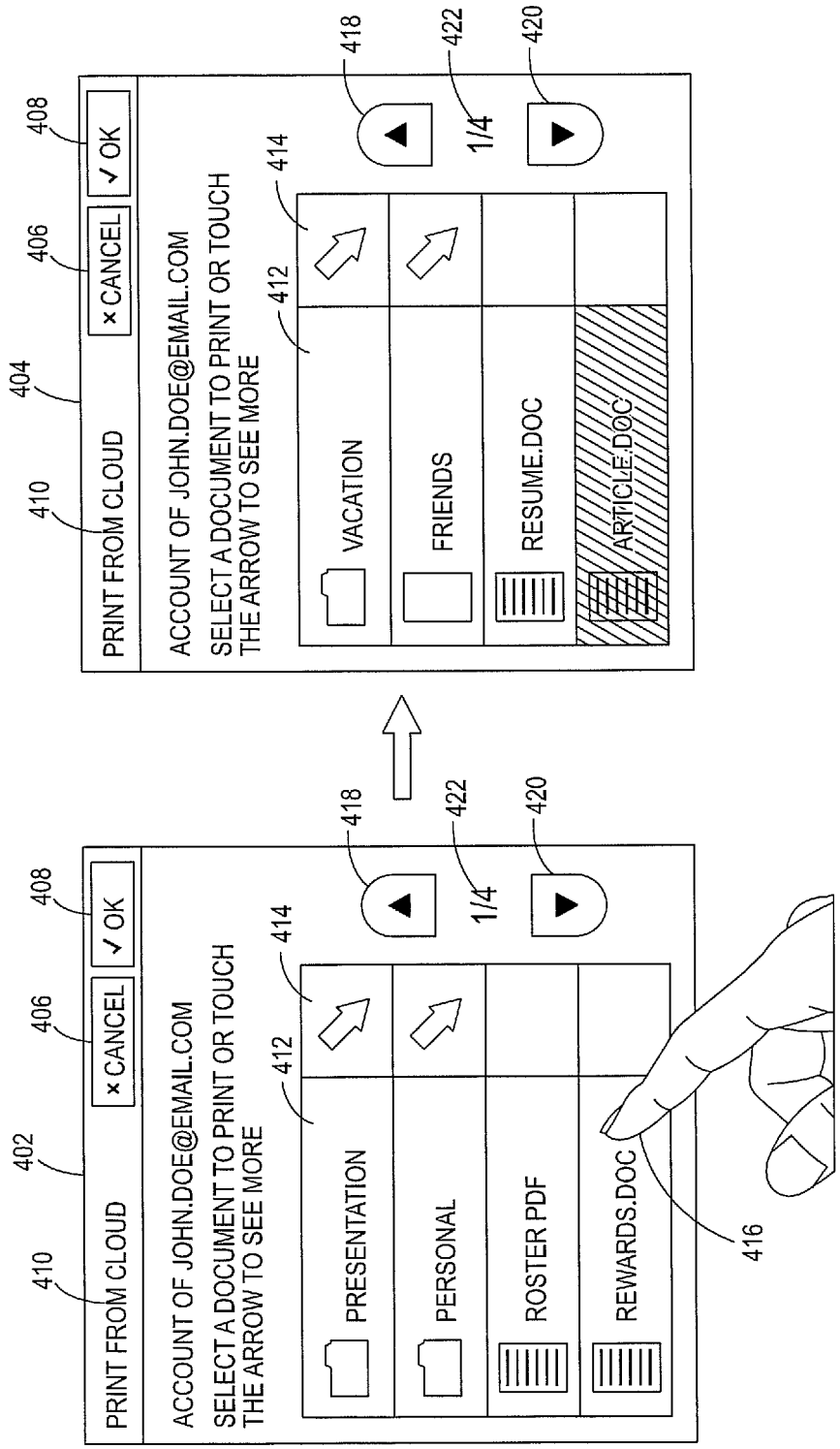
FIG. 4 illustrates a second example screen shot of the input in the cloud printing application.

FIGS. 2-4 illustrate different sequences of inputs and responses based on different cloud applications that are selected using the touch screen UI of the MFD 100. For example, FIGS. 2-4 illustrate example screenshots of a modified UI of the UI typically used for the plurality of different cloud applications of the cloud storage service provider.

FIG. 2 illustrates a screenshot 202 and a screenshot 204 of the touch screen UI when a cloud scanning application is currently selected. For example, the user may select a scan function on the MFD 100 after the user has logged into his or her cloud storage service provider account.

The screenshot 202 includes an indication 210 of the application that is selected, a cancel button 206, an OK button 208, a list of folders 212, list of navigation arrows 214, an up scroll button 218, a down scroll button 220 and an indication 222 of a number of pages. In the screenshot 202, the OK button 208 may be grayed out as no action can be performed until an input is received.

In one embodiment, the list of navigation arrows 214 may indicate that the folder contains additional files or folders. In one embodiment, each arrow of the list of navigation arrows 214 may be pointed towards a bottom right corner of the box. The direction of the arrow provides a natural and intuitive direction for users to understand that selecting the arrow takes the user "down" another level in a folder.

In one embodiment, the list of navigation arrows 214 may only include an arrow next to a folder that contains additional files or folders. For example, if the folder is empty, no arrow may be displayed next to the folder. When a user selects a navigation arrow from the list of navigation arrows 214, the input may be translated as a command to open the folder. The UI detects that the command is detected by highlighting the navigation arrow. The contents of the folders may be displayed in a subsequent screen. The design of the icon used to illustrate the list of navigation arrows 214 provides a more intuitive design over currently used icons that include an arrow pointing to the right or a plus sign with a circle.

In one embodiment, the indication 210 indicates that the scan to cloud application is selected. A user may use his or her finger 216 to provide an input. As noted above, the touch screen UI only allows for a single input (e.g., a touch of the display 102) that is used to perform all actions on the MFD 100. In one example, the user selects the "screenshots" folder with the user's finger 216.

After the input is received by the MFD 100, the input may be translated based upon a particular function associated with the cloud application that was selected. For example, when the cloud scanning application is selected, the input may be translated as a selection of a destination folder for a scanned document.

The screenshot 204 indicates that the "screenshots" folder has been highlighted as a selection for a destination folder for a scanned document. Notably, the folder was not "opened" and a new screen with the contents of the folder is not displayed. In addition, the OK button 208 is no longer grayed out. In other words, the OK button 208 is activated indicating that the document may be scanned and will be saved in the "screenshots" folder in the cloud storage service provider (e.g., the DB 108).

FIG. 3 illustrates a screenshot 302 and a screenshot 304 of the touch screen UI when a cloud printing application is currently selected. For example, the user may select a print function on the MFD 100 after the user has logged into his or her cloud storage service provider account.

The screenshot 302 includes an indication 310 of the application that is selected, a cancel button 306, an OK button 308, a list of folders 312, a list of arrows 314, an up scroll button 318, a down scroll button 320 and an indication 322 of a number of pages. In the screen shot 302, the OK button 308 may be grayed out as no action can be performed until an input is received.

As noted above, the list of arrows 314 may indicate that the folder contains additional files or folders. The screenshot 302 indicates an arrow associated with the presentations folder and the personal folder. However, no arrow is associated with the Roster.PDF file or the Rewards.DOC file because no additional content is within the Roster.PDF file or the Rewards.DOC file.

In one embodiment, the indication 310 indicates that the print from cloud application is selected. A user may use his or her finger 316 to provide an input. As noted above, the touch screen UI only allows for a single input that is used to perform all actions on the MFD 100. For example, the input was used in the screenshots 202 and 204 to scan a document to a destination folder.

In the screenshot 302, the user's finger 316 may select a "personal" folder. After the input is received by the MFD 100, the input may be translated based upon a particular function associated with the cloud application. For example, when the cloud printing application is selected, the input may be translated as an "open folder" command since a folder cannot be printed. In other words, the cloud printing application is waiting for a selection of a document to be printed. When a file or folder that is selected, the input is automatically translated into an "open folder" command. In one embodiment, the touch screen UI may indicate that the "open folder" command has been detected by highlighting the row in the list of files 312 and the associated arrow in the list of arrows 314.

The screenshot 304 illustrates in FIG. 3 that a new list of files 312 is displayed. Notably, the touch screen UI of the present disclosure does not show an additional window pane to the right of the previous list of files 312. Rather, the touch screen UI displays a name of the folder 330 that was selected in the screenshot 302 to indicate the folder being viewed and the folder's contents in list of files 312. This is to allow the files or folders in the list of files 312 to be large enough for easy selection given the small dimensions of the display 102.

In one embodiment, a back button 324 may also appear. This allows the user to go back up one level in the file directory if the contents within the list of files 312 are not what the user was looking for. Notably, the OK button 308 is still grayed out as no file has been selected that can be printed.

FIG. 4 illustrates a screenshot 402 and a screenshot 404 while still in the cloud printing application. The screenshot 402 includes an indication 410 of the application that is selected, a cancel button 406, an OK button 408, a list of folders 412, a list of arrows 414, an up scroll button 418, a down scroll button 420 and an indication 422 of a number of pages. In the screen shot 402, the OK button 408 may be grayed out as no action can be performed until an input is received.

In this example while the cloud printing application is selected, the user selects the Rewards.DOC file with his or her finger 416. After the input is received by the MFD 100, the input may be translated based upon a particular function associated with the cloud application. For example, when the cloud printing application is selected, the input may be translated as a selection of a document for printing. For example, since the file that was selected is a document (e.g., is not a folder that contains additional files or folders as described above in FIG. 3), the file may be highlighted and selected for printing.

The screenshot 404 illustrates in FIG. 4 that the Rewards.DOC file has been highlighted after the input was received and translated. The OK button 408 is no longer grayed out. Said another way, the OK button 408 is now activated. The user may select the OK button 408 and the highlighted document, Rewards.DOC, may be printed.

Notably, the same single input (e.g., a touch) may be used to perform three different actions depending on the cloud application that was selected and a function associated with the cloud application. For example, the input was used to select a destination folder in the cloud scanning application, the input was used to open a folder in a cloud printing application, and the input was used to select a document for printing in the cloud printing application. In addition, the complete hierarchy of folders that were traversed were not displayed due to the limited size of the display 102. Rather only the name of the selected folder and the contents within the selected folder are displayed. In addition, no horizontal scroll bars are used in the touch screen UI of the display 102.

Figure 5:
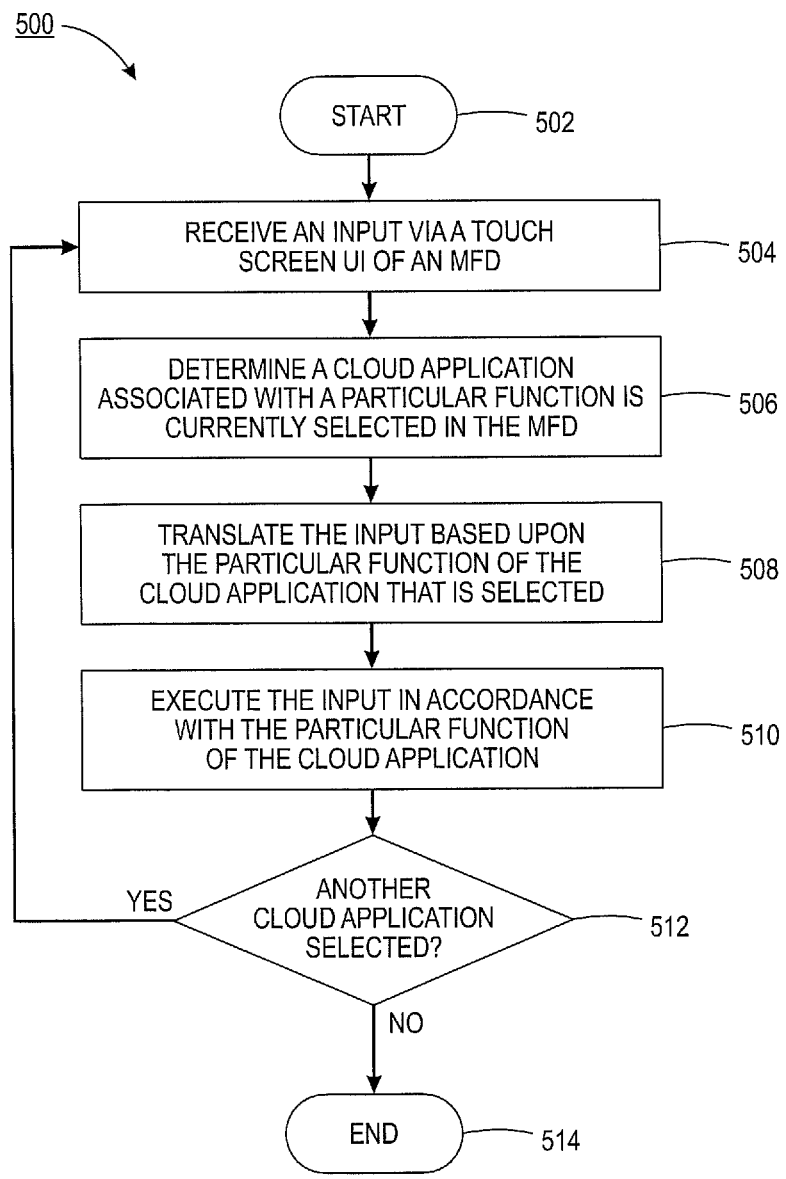
FIG. 5 illustrates an example flowchart of a method for navigating a file directory on a touch screen user interface (UI) of an MFD.
Figure 6:
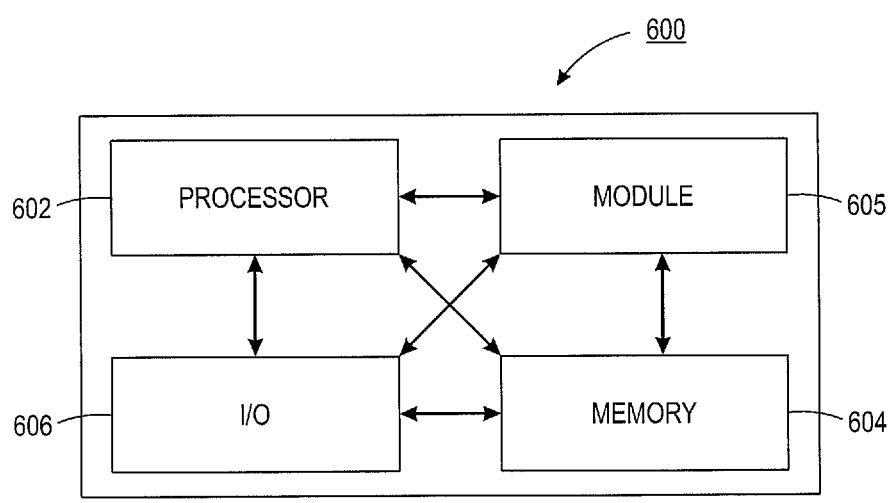
FIG. 6 illustrates a high-level block diagram of a computer suitable for use in performing the functions described herein.

FIG. 5 illustrates a flowchart of a method 500 for navigating a file directory on a touch screen user interface UI of an MFD. In one embodiment, one or more steps, or operations, of the method 500 may be performed by the MFD 100 or a computer as illustrated in FIG. 6 and discussed below.

At block 502 the method 500 begins. At block 504, the method 500 receives an input via a touch screen UI of an MFD. In one embodiment, a user may touch an area of a display of the MFD. The display may have the touch screen UI and may receive touch as an input. Depending on where the touch is received on the display and what cloud application is selected on the MFD, the touch input may be translated and executed as a particular function associated with the cloud application that is selected.

In one embodiment, the touch screen UI may be a modified UI of a plurality of different cloud applications. For example, the UI that would typically be displayed on a larger monitor for a cloud storage service (e.g., a file directory tree with drop down arrows that display additional files nested within the file directory tree, additional window panes generated on a right hand side as folders are opened to display additional content within the folder, and the like) is modified to display within a smaller display of the MFD. For example, the display of the MFD may have dimensions that are less than 12 inches by 12 inches. In one embodiment, the dimensions of the MFD may be less than 5 inches by 7 inches.

In one embodiment, the MFD may allow a user to directly log into the user's account on the cloud applications. The MFD may then be used to execute different functions associated with the cloud applications. For example, the MFD may scan to a folder in the cloud application, print a file from the cloud application, and the like.

At block 506, the method 500 determines that a cloud application associated with a particular function is currently selected in the MFD. For example, the user may select a cloud printing application or a cloud scanning application on the MFD.

At block 508, the method 500 translates the input based upon the particular function of the cloud application that is selected. For example, the same touch input may be used to perform a variety of different functions on the MFD. How the touch input is translated may depend on the cloud application that is selected.

For example, in a cloud scanning application, a touch input of a folder may be interpreted as a selection of the folder as a destination folder to store a scanned document. In another example, in a cloud printing application, the same touch input of a folder may be interpreted as an "open folder" command to open the folder. In the cloud printing application, the same touch input of a document may be interpreted as a print document command to print the document that is selected.

At block 510, the method 500 executes the input in accordance with the particular function of the cloud application. Using the above examples, the input may be executed as a selection of the folder as a destination folder to store a scanned document in a cloud scanning application. In other words, when a user touches a folder in the cloud scanning application, the folder may be highlighted. The folder is not opened to display a new screen with new files and folders.

In contrast, the input may be executed as an "open folder" command in a cloud printing application. In other words, when a user touches a folder in the cloud printing application, the folder may be opened to display a new screen with the contents of the folder. Notably, the new screen does not display a nested structure of higher-level files and folders. Said another way, the new screen only displays one level of the file directory at a time. Rather, due to the limited size of the display of the MFD, only the name of the parent folder and the contents of the parent folder (e.g., the folder that is opened) are shown on the display.

In another example, the input may be executed as a print document command in the cloud printing application. In other words, when a user touches a file or document in the cloud printing application, the file or document may be recognized as the file to be printed on the MFD.

At block 512, the method 500 determines if another cloud application was selected. If another cloud application was selected (e.g., the user selects to scan or print another document or change cloud applications from a cloud printing application to a cloud scanning application and vice versa), the method 500 may return to block 504 and blocks 504-512 may be repeated. If another cloud application was not selected, the method 500 may proceed to block 514. At block 514 the method 500 ends.

It should be noted that although not explicitly specified, one or more steps, functions, or operations of the method 500 described above may include a storing, displaying and/or outputting step as required for a particular application. In other words, any data, records, fields, and/or intermediate results discussed in the methods can be stored, displayed, and/or outputted to another device as required for a particular application. Furthermore, steps, functions, or operations in FIG. 5 that recite a determining operation, or involve a decision, do not necessarily require that both branches of the determining operation be practiced. In other words, one of the branches of the determining operation can be deemed as an optional step.

As a result, the embodiments of the present disclosure improve the functioning of a computer or a device. For example, the functioning of an MFD may be improved by providing an improved file directory and a method for navigating the file directory on a touch screen UI of an MFD. In addition, the embodiments of the present disclosure transform a single input to perform a variety of different actions or functions based upon a cloud application that is selected. Notably, no previous machine or computer was capable of performing the functions described herein as the present disclosure provides an improvement in the technological arts of displays on MFDs.

FIG. 6 depicts a high-level block diagram of a computer that can be transformed to into a machine that is dedicated to perform the functions described herein. Notably, no computer or machine currently exists that performs the functions as described herein. As a result, the embodiments of the present disclosure improve the operation and functioning of the computer to provide navigation of a file directory on a touch screen UI of an MFD, as disclosed herein.

As depicted in FIG. 6, the computer 600 comprises one or more hardware processor elements 602 (e.g., a central processing unit (CPU), a microprocessor, or a multi-core processor), a memory 604, e.g., random access memory (RAM) and/or read only memory (ROM), a module 605 for navigating a file directory on a touch screen user interface UI of an MFD, and various input/output devices 606 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computer may employ a plurality of processor elements. Furthermore, although only one computer is shown in the figure, if the method(s) as discussed above is implemented in a distributed or parallel manner for a particular illustrative example, i.e., the steps of the above method(s) or the entire method(s) are implemented across multiple or parallel computers, then the computer of this figure is intended to represent each of those multiple computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computer or any other hardware equivalents, e.g., computer readable instructions pertaining to the method(s) discussed above can be used to configure a hardware processor to perform the steps, functions and/or operations of the above disclosed methods. In one embodiment, instructions and data for the present module or process 605 for navigating a file directory on a touch screen user interface UI of an MFD (e.g., a software program comprising computer-executable instructions) can be loaded into memory 604 and executed by hardware processor element 602 to implement the steps, functions or operations as discussed above in connection with the exemplary method 500. Furthermore, when a hardware processor executes instructions to perform "operations", this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 605 for navigating a file directory on a touch screen user interface UI of an MFD (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method for navigating a file directory on a touch screen user interface (UI) of a multi-function device (MFD), comprising:

connecting, by a processor, to an application server and a database of a cloud based storage provider, wherein the database displays files in a file tree directory system that drops down additional files and folders when a file is clicked;

displaying, by the processor, a modified UI of the file tree directory system displayed by the database, wherein the modified UI is displayed on the touch screen UI of the MFD, wherein the modified UI displays a plurality of touch inputs, wherein the modified UI displays a selected cloud application from a plurality of different cloud applications provided by the application server and the database of the cloud based storage provider, wherein each one of the plurality of different cloud applications comprises at least a cloud printing application and a cloud scanning application, and a single touch input executes different functions based on the selected cloud application that is displayed;

receiving, by the processor, the single touch input via the touch screen UI of the MFD, wherein the single touch input selects an icon in the touch screen UI of the MFD and indicates a plurality of functions to be executed based on the single touch input and the selected cloud application that is displayed, wherein the icon comprises a folder when the cloud application that is selected is the cloud scanning application, wherein the icon comprises a document when the cloud application that is selected is the cloud printing application;

determining, by the processor, the cloud application that is currently selected in the MFD;

translating, by the processor, the single touch input to perform the plurality of functions based upon the cloud application that is selected, wherein the translating comprises translating the single touch input of the folder in the cloud scanning application as a destination of a scanned document, wherein the translating comprises translating the single touch input of the document in the cloud printing application as a selection of the document to be printed; and executing, by the processor, the plurality of functions associated with the cloud application that is currently selected in response to the single touch input, wherein the plurality of functions that are executed in the cloud scanning application comprises highlighting the selection of the folder without opening the folder in the touch screen UI and storing the scanned document in the folder, wherein the plurality of functions that are executed in the cloud printing application comprises highlighting the document that is selected and printing the document.

2. A non-transitory computer-readable medium storing a plurality of instructions, which when executed by a processor, cause the processor to perform operations for navigating a file directory on a touch screen user interface (UI) of a multi-function device (MFD), comprising:

connecting to an application server and a database of a cloud based storage provider, wherein the database displays files in a file tree directory system that drops down additional files and folders when a file is clicked;

displaying a modified UI of the file tree directory system displayed by the database, wherein the modified UI is displayed on the touch screen UI of the MFD, wherein the modified UI displays a plurality of touch inputs, wherein the modified UI displays a selected cloud application from a plurality of different cloud applications provided by the application server and the database of the cloud based storage provider, wherein each one of the plurality of different cloud applications comprises at least a cloud printing application and a cloud scanning application, and a single touch input executes different functions based on the selected cloud application that is displayed;

receiving the single touch input via the touch screen UI of the MFD, wherein the single touch input selects an icon in the touch screen UI of the MFD and indicates a plurality of functions to be executed based on the single touch input and the selected cloud application that is displayed, wherein the icon comprises a folder when the cloud application that is selected is the cloud scanning application, wherein the icon comprises a document when the cloud application that is selected is the cloud printing application;

determining, by the processor, the cloud application that is currently selected in the MFD;

translating, by the processor, the single touch input to perform the plurality of functions based upon the cloud application that is selected, wherein the translating comprises translating the single touch input of the folder in the cloud scanning application as a destination of a scanned document, wherein the translating comprises translating the single touch input of the document in the cloud printing application as a selection of the document to be printed; and executing, by the processor, the plurality of functions associated with the cloud application that is currently selected in response to the single touch input, wherein the plurality of functions that are executed in the cloud scanning application comprises highlighting the selection of the folder without opening the folder in the touch screen UI and storing the scanned document in the folder, wherein the plurality of functions that are executed in the cloud printing application comprises highlighting the document that is selected and printing the document.

* * * * *